US011099469B1

(12) United States Patent
Selfe et al.

(10) Patent No.: US 11,099,469 B1
(45) Date of Patent: Aug. 24, 2021

(54) ULTRA-SHORT THROW PROJECTOR WITH TRANSMISSIVE LIQUID CRYSTAL DISPLAY

(71) Applicant: Amazon Technologies, Inc., Seattle, WA (US)

(72) Inventors: Gareth James Selfe, San Francisco, CA (US); Eric Gifford Marason, San Francisco, CA (US); Suchit Shah, San Jose, CA (US); Robert Domingo Lau, Danville, CA (US); John Larkin, Monterey, CA (US); Mark Steven Pearson, Union City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/680,299

(22) Filed: Nov. 11, 2019

(51) Int. Cl.
*G03B 21/20* (2006.01)
*G03B 21/28* (2006.01)
*G02B 3/08* (2006.01)

(52) U.S. Cl.
CPC .......... *G03B 21/2033* (2013.01); *G02B 3/08* (2013.01); *G03B 21/28* (2013.01)

(58) Field of Classification Search
CPC .... G03B 21/006; G03B 21/28; G03B 21/145; G03B 21/208; G03B 21/2033; G03B 21/2053; H04N 9/315; H04N 9/3108; H04N 9/3141; H04N 9/3144; H04N 9/3152; H04N 9/3155; H04N 9/3161
See application file for complete search history.

(56) References Cited

U.S. PATENT DOCUMENTS

| 2009/0153977 | A1* | 6/2009 | Chen | H04N 9/3111 |
| | | | | 359/634 |
| 2011/0109818 | A1* | 5/2011 | Uneda | H04N 9/3105 |
| | | | | 349/5 |
| 2011/0164416 | A1* | 7/2011 | Pujol | F21V 7/28 |
| | | | | 362/235 |
| 2011/0228177 | A1* | 9/2011 | Fukuda | G03B 21/208 |
| | | | | 349/5 |
| 2014/0185288 | A1* | 7/2014 | Cunningham | F21V 29/717 |
| | | | | 362/235 |

* cited by examiner

*Primary Examiner* — Sultan Chowdhury
(74) *Attorney, Agent, or Firm* — Eversheds Sutherland (US) LLP

(57) ABSTRACT

Devices, systems, and methods are provided for an ultra-short throw projector. The projector may include an illuminator having an ellipsoidal reflector, a light emitting diode (LED) positioned inside of the ellipsoidal reflector, and a Fresnel lens positioned inside of the ellipsoidal reflector. The projector may include a circular transmissive liquid crystal display (LCD) and a three-element plastic projection lens positioned outside of the ellipsoidal reflector, wherein the circular transmissive LCD is positioned between the ellipsoidal reflector and the three-element plastic projection lens, wherein the ellipsoidal reflector reflects light emitted by the LED, wherein the Fresnel lens refracts light emitted by the LED, and wherein the three-element plastic projection lens projects the reflected light and the refracted light.

20 Claims, 6 Drawing Sheets

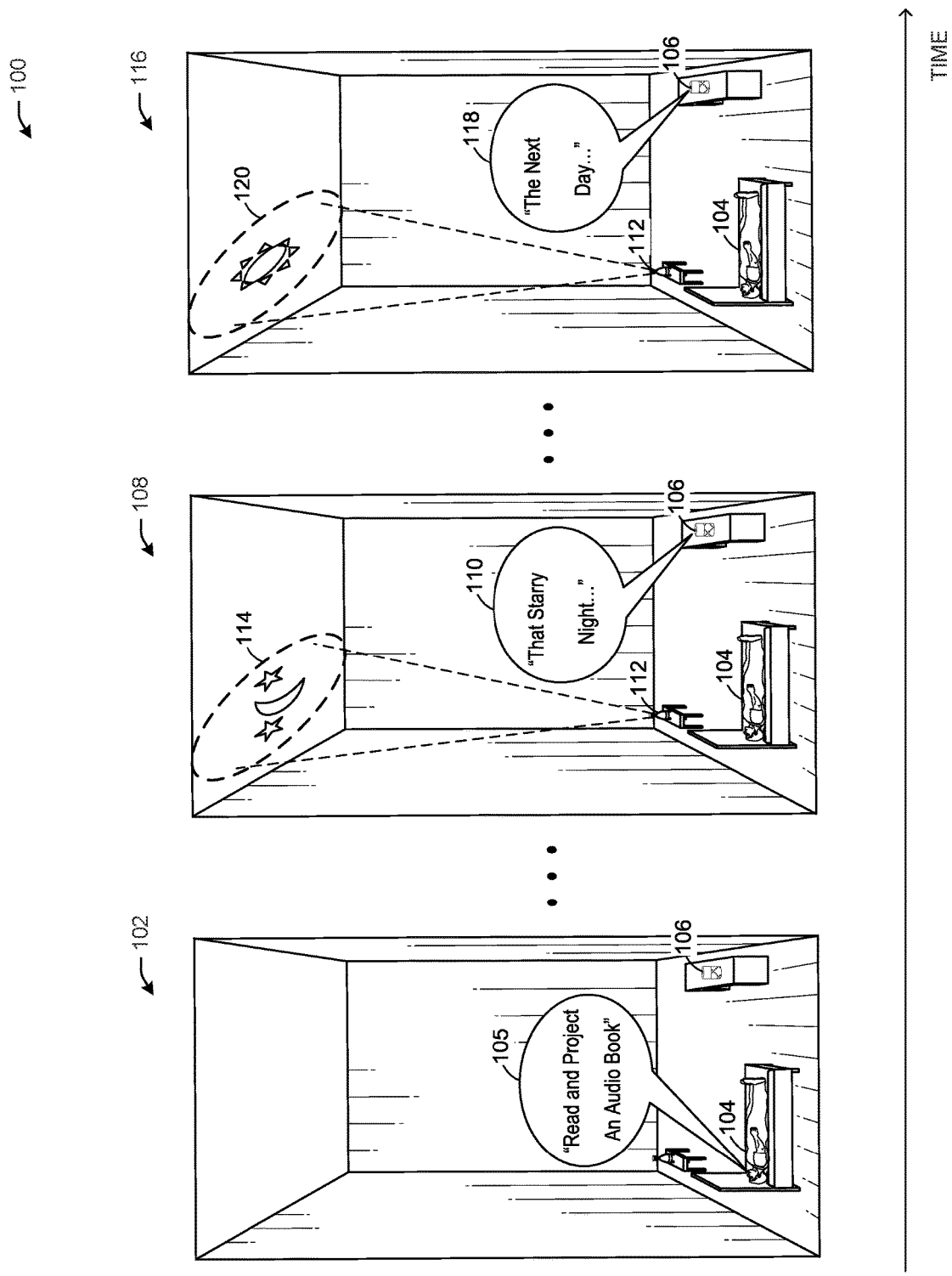

ULTRA-SHORT THROW PROJECTOR WITH TRANSMISSIVE LIQUID CRYSTAL DISPLAY

BACKGROUND

Projector devices may project images of different sizes from various distances. The size of a projected image may depend on a distance of the projector device from a screen. Some projected images may need longer projection distances. To project images from shorter projection distances, the projection equipment used may be expensive and additional to the projection equipment used to project images from longer distances. Therefore, there is a need for improved projector devices and processes to project images from short distances while minimizing cost and negative visual effects.

BRIEF DESCRIPTION OF THE DRAWINGS

FIG. 1A illustrates an example process for using an ultra-short throw projector with a transmissive liquid crystal display (LCD), in accordance with one or more example embodiments of the present disclosure.

DETAILED DESCRIPTION

Overview

Figure 1B:
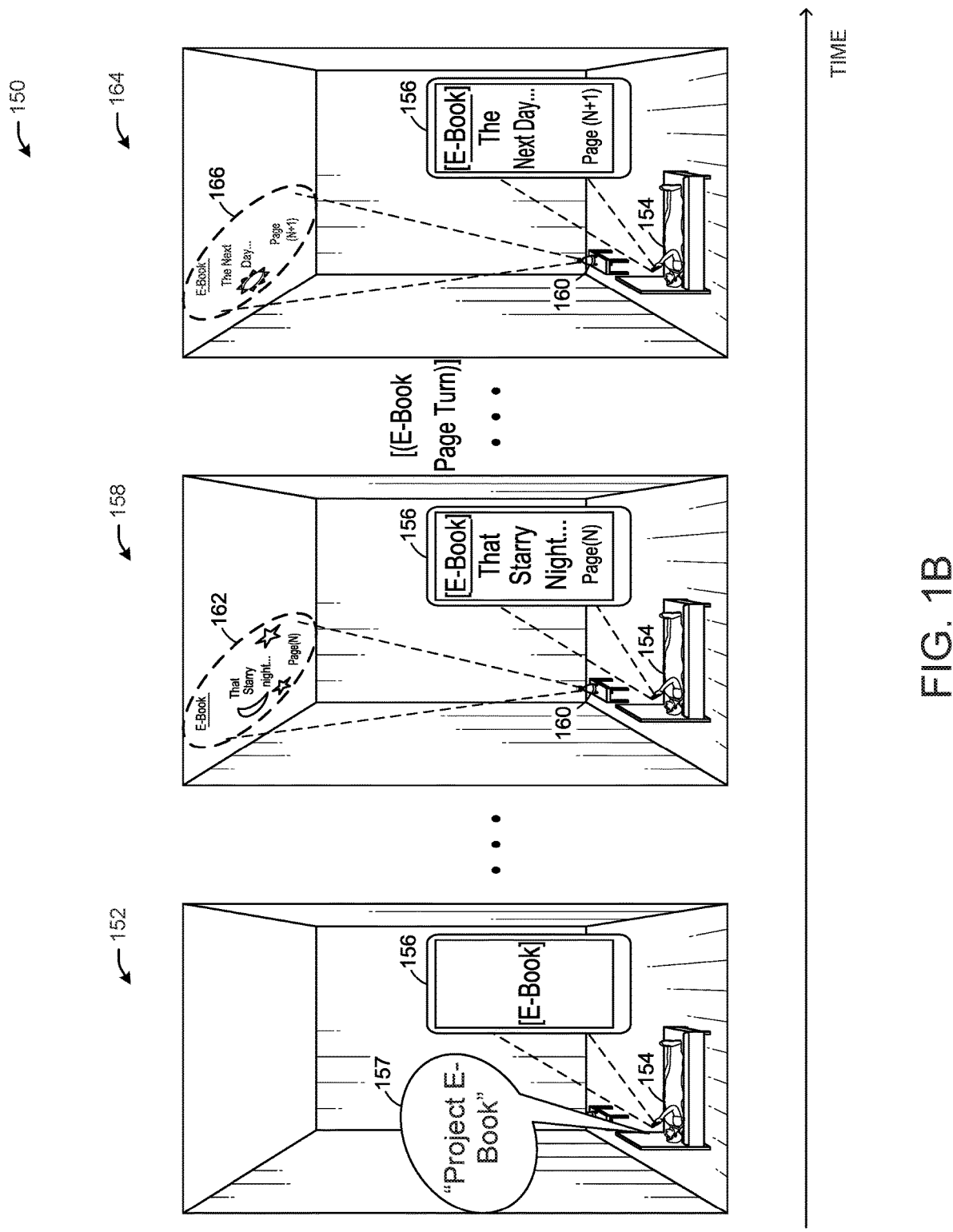
FIG. 1B illustrates an example process for using an ultra-short throw projector with a transmissive LCD, in accordance with one or more example embodiments of the present disclosure.

Example embodiments described herein provide certain systems, methods, and devices for using an ultra-short throw projector with a transmissive liquid crystal display (LCD).

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

Projectors are being used increasingly to watch movies and television, play games, and present other visual content. To present images (e.g., eight feet in circular diameter) from short distances (e.g., five feet or less) from a display, a projector device may require expensive equipment, may waste flux from a light source (e.g., a light emitting diode), may require significant and expensive pixel magnification and modulation transfer function. In addition, the size of the projected image may correspond directly to the amount of heat generated by a light source of the projector device, and a higher amount of generated heat may require a fan or other cooling mechanism.

The selection of projector components for ultra-short throw projectors may depend on the use of the ultra-short throw projector. In particular, projectors may be used as "emersion" devices, meaning that projectors may not be limited to playing video for television, movies, or games, but also may be used to project content that is supplemental to other content presented on other devices. For example, a projector device may present a starry night or a map on a person's ceiling or wall without any correlation to other content being presented elsewhere, but also may present images and/or text related to books being presented on other devices, and/or related to audio or video being presented on other devices. Thus, the content presented by a projector may be in the same format as content presented by another device (e.g., both devices may present text or images) or may be in a different format as content presented by another device (e.g., the projector may present images while another one or more devices may present corresponding audio, text, or other content).

Ultra-short throw projectors capable of projecting images from short distances may be expensive, so there is a need for an optimal combination of cost, brightness, and picture resolution for ultra-short throw projectors.

In one or more embodiments, an ultra-short throw projector may project an image with an eight-foot or greater diameter from a projection distance (e.g., a distance between the ultra-short throw projector and a display or other surface onto which the ultra-short throw projector projects images) of five feet or shorter. To provide such ultra-short throw projection at a low cost, the ultra-short throw projector may use low-lumen projection for darkened rooms and may include a circular transmissive 480p in-plane switching liquid crystal display (LCD), an illuminator including an ellipsoidal reflector, an positive Fresnel lens positioned within the illuminator, one or more high-powered surface mounted light sources (e.g., light-emitting diodes), a heat sink for dissipating heat produced by the one or more light sources, and a multi-element plastic projection lens through which light emitted by the one or more light sources and reflected by the ellipsoidal reflector and the Fresnel lens may pass.

In one or more embodiments, the ultra-short throw projector may serve as a stand-alone device for projecting content, or may serve as a supplemental device which projects content in concert with other content being presented on one or more other devices, such as projecting images corresponding to electronic book content displayed or narrated (e.g., an audio book narration) by another device, and/or images corresponding to other content displayed and/or narrated by one or more other devices. The ultra-short throw projector may display images and text corresponding to bedtimes stories or other books and/or music, images and text shown in an electronic book or supplementing the text of an electronic book (e.g., images showing what is described in an electronic book), space and sky images, sleep-inducing images accompanying sounds rendered by one or more other devices, security/alert information such as alarm or doorbell information, temperature information, and the like, calendar and clock information, including schedules, day/time, scheduled events, and the like.

In one or more embodiments, the ultra-short throw projector may operate in correspondence with voice-activated commands. For example, other devices may identify voice utterances requesting the playback of content, operation of other devices, or audio/video responses to questions. When such a voice utterance is identified, the ultra-short throw projector may receive content corresponding to the requested content, answer to a voice-uttered question, or operation of another device, and may project the content. For example, a user may utter a voice command such as to "Play an audio book." The voice-enabled device that receives the voice utterance may respond by playing the audio book (e.g., a narration of the requested book), and the ultra-short throw projector may receive images and/or text of the requested book to project as the user listens to the audio narration.

In one or more embodiments, to reduce off-axis keystone distortion (e.g., which may be caused by projection of a rectangular image), the ultra-short throw projector's use of a circular transmissive LCD may result in a circular image. The ultra-short throw projector's use of a low-power light source with the ellipsoidal reflector and Fresnel lens may reduce the amount of flux wasted by the light source. By using the 480p LCD, the ultra-short throw projector may reduce the required magnification and modulation transfer function due to the large pixels of the 408p LCD when compared with higher resolution displays. The reduction in required magnification and modulation transfer function may allow for the use of a smaller and simpler projection lens, thereby reducing cost of manufacture. By using a catadioptric design of the illuminator (e.g., a design which combines refraction and reflection), the ultra-short throw projector may capture light and direct the light using a specific illumination profile to a precise acceptance angle for any image zone as presented by a smaller diameter lens (e.g., a F/2.5 lens). For example, the illuminator may be designed, and the Fresnel lens may be sized and positioned, such that light emitted by the ultra-short throw projector reflects off of either the ellipsoidal reflector or the Fresnel lens in a way that the light is directed to the multi-element projection lens for the image zones used in the projection. The result may be a projected image uniformity from the center of the projected image to the edge of the projected image, and may account for the lack of light scattered by the LCD (e.g., when compared to the light scattered by other images/slide). For example, some bulb/scattering techniques used by projectors may capture any light, whereas the ultra-short throw projector may conserve light by tailoring the angles of reflection. In addition, a relatively larger imager used by the ultra-short throw projector may reduce the effects of heat generated by a light source, thereby avoiding a need for a fan (which can be noisy and adds extra cost). The ultra-short throw projector may provide an optimal combination of cost, brightness, and resolution for a projector.

In one or more embodiments, because up to 97% of the illumination light from the LED of the ultra-short throw projector may be converted to heat via absorption by the LCD, a large diameter LCD has more surface area to evenly distribute heat and thereby reduce the likelihood of LCD damage, image corruption, and/or shortening of LCD lifetime.

In one or more embodiments, the ultra-short throw projector may connect to one or more remote networks (e.g., cloud-based networks) using wireless communications as described further herein. The one or more remote networks may provide content and instructions to the ultra-short throw projector regarding when and how to project content. Content may be streamed to the ultra-short throw projector in real-time while corresponding content is presented by another device, or may be presented entirely to the ultra-short throw projector before presentation. For example, when the content corresponds to an electronic book, some images may be correspond to a page or chapter, and other images may correspond to a different page or chapter. The instructions may indicate when to switch from one image to another image so that the projection corresponds to the book being read or narrated. For example, any image to be projected by the ultra-short throw projector may have an identifier, and the instructions may indicate the time at which an image identified by the identifier is to be presented.

In one or more embodiments, the ultra-short throw projector may use machine learning techniques to identify content to present at any given time. For example, based on user preferences and/or mood, the ultra-short throw projector may project images that machine learning determines may be desirable to a viewer.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1A illustrates an example process 100 for using an ultra-short throw projector with a transmissive LCD, in accordance with one or more example embodiments of the present disclosure.

Referring to FIG. 1A, the process 100 may include step 102, in which a user 104 utters a voice utterance 105 (e.g., "Project an audio book," "Play an audiobook with projector content," "Play audio content with images," or the like). A voice-enabled device 106 may detect the voice utterance 105 (e.g., using one or more microphones, not shown in FIG. 1A). At step 108, in response to the voice utterance 105, the voice-enabled device 106 may present a narration 110 of the audio book (e.g., narrating a page of the audio book). Before step 108, the voice-enabled device 106 may present an audio prompt (not shown) offering or confirming whether the user 104 would like to present images in addition to audio content that is already playing or in addition to audio content requested (e.g., when the voice utterance 105 specifies audio content to be played by the voice-enabled device 106). While the voice-enabled device 106 may present the narration 110 of the audio book, a projector 112 may present an image 114 on a wall or ceiling, and the image 114 may correspond to the narration 110 (e.g., when the narration 110 describes a starry night, the image 114 may include a starry nighttime sky). At step 116, the voice-enabled device 106 may present a narration 118 of the audio book (e.g., narrating another page of the audio book). The projector 112 may project another image 120, which may correspond to the narration 118 (e.g., when the narration describes another day, sunrise, morning, etc., the image 120 may show something different than the image 114, such as the sun rising). The voice utterance 105 may not specify particular content to present, but instead may specify a task or routine, such as "Initiating morning routine," "Initiate bedtime routine," or the like. The task or routine may correspond to content that the user prefers, such as a bedtime story, night sky images, weather reports, schedules/calendars, and other images.

FIG. 1B illustrates an example process 150 for using an ultra-short throw projector with a transmissive LCD, in accordance with one or more example embodiments of the present disclosure.

Referring to FIG. 1B, the process 150 may include step 152, in which a user 154 reads an electronic book (e-book called [E-Book]) using a device 156. The user 154 may make utter a voice utterance 157 (e.g., "Project E-Book") corresponding the E-Book presented by the device 156. The voice utterance 157 may indicate a request to project content corresponding to the E-Book or any other content presented using the device 156. Alternatively, while not shown, the device 156 may present selectable options to the user 154 that, when selected, indicate a request to project content corresponding to the E-Book or any other content presented using the device 156. At step 158, the device 156 may present the text of the e-book (e.g., page N). While the device 156 presents Page N, a projector 160 may present an image 162 on a wall or ceiling, and the image 162 may correspond to the page N of the e-book (e.g., may include the text of page N and/or graphics corresponding to the text of page N). At step 164, the user 154 may "turn" the page of the e-book using the device 156 (e.g., from page N to page N+1). While the device 156 presents page N+1 of the e-book, the projector 160 may present an image 166, which may include the text of page N+1 of the e-book and/or graphics corresponding to the text of page N+1 of the e-book.

Referring to FIG. 1A and FIG. 1B, the projector 112 and the projector 160 may present a variety of content. While FIG. 1A and FIG. 1B show the projector 112 and the projector 160 displaying images corresponding to an audio book and e-book, respectively, the projector 112 and the projector 160 may present other types of content. For example, the projector 112 and the projector 160 may present music videos and cover art corresponding to audio tracks being played (e.g., using the voice-enabled device 106 or the device 156). The projector 112 and the projector 160 may present images of the sky, nature, or space, which may be accompanied by sounds (e.g., rendered by the voice-enabled device 106 or the device 156). The projector 112 and the projector 160 may present images that correspond to audio played by the voice-enabled device 106 or the device 156, such as images of content that is narrated (e.g., answers to voice-uttered questions). For example, when a voice utterance asks, "Where is the Eiffel Tower?" the voice-enabled device 106 or the device 156 may present a narrated answer regarding the Eiffel Tower (e.g., "The Eiffel Tower is in Paris, France"), while the projector 112 and the projector 160 may present images of Paris, France, the Eiffel Tower, a map, or the like. When a voice utterance asks, "Who was the 44$^{th}$ President of the United States?" the projector 112 and the projector 160 may display an image of President Barack Obama along with other information about the President while the voice-enabled device 106 or the device 156 provides a narrated answer indicating that Barack Obama was the 44$^{th}$ President. The projector 112 and the projector 160 may present other images or indicators, such a scheduled event, the date and/or time, the weather, the operating states of other devices (e.g., a room or device temperature, whether lights are on or off, whether security cameras are active and/or capturing movement, and the like). The ways that the projector 112 and the projector 160 may receive content based on voice utterances are explained further below with regard to FIG. 2.

In one or more embodiments, the voice-enabled device 106 and the device 156 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2:
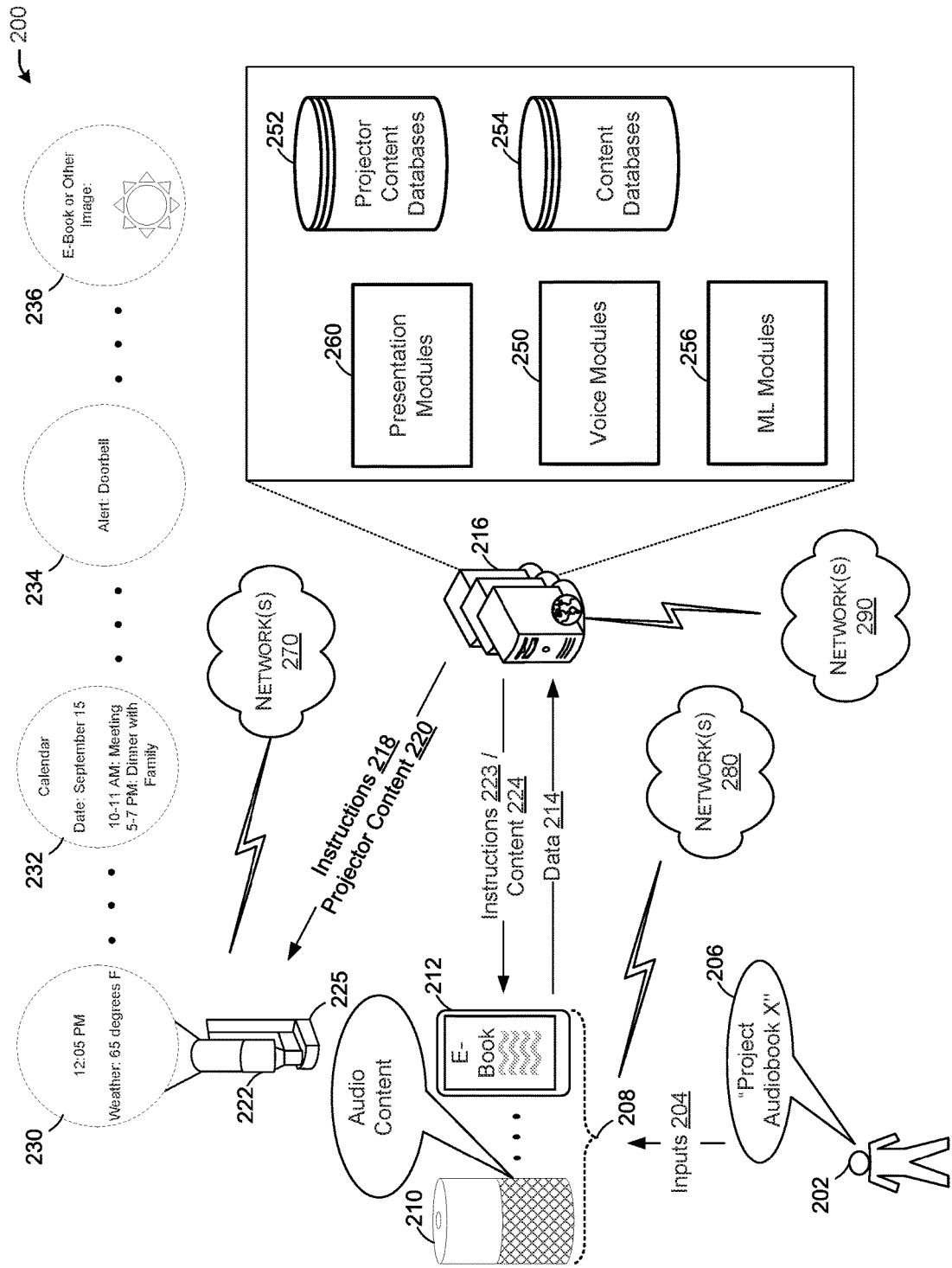
FIG. 2 illustrates a system for using an ultra-short throw projector with a transmissive LCD, in accordance with one or more example embodiments of the present disclosure.

FIG. 2 illustrates a system 200 for using an ultra-short throw projector with a transmissive LCD, in accordance with one or more example embodiments of the present disclosure.

Referring to FIG. 2, the system 200 may include a user 202 (e.g., similar to the user 104 of FIG. 1A or the user 154 of FIG. 1B) who may provide inputs 204 (e.g., voice utterances 206 or other physical inputs, such as button pushes, gestures, swipes, etc.) to one or more voice-enabled devices 208 (e.g., including voice-enabled device 210 and/or voice-enabled device 212, which may be similar to the voice-enabled device 106 of FIG. 1A and/or the device 156 of FIG. 1B). The one or more voice-enabled devices 208 may send data 214 (e.g., voice utterances, indications of received inputs/commands, device identifier data, information related to the user 202, indications that an e-book page was turned/switched on the voice-enabled device 212, etc.) to one or more remote servers 216 (e.g., a cloud-based server). The one or more remote servers 216 may analyze the data 214 and determine instructions 218 (e.g., regarding which content to play and when) and projector content 220 to be presented by a projector 222 (e.g., similar to the projector 112 of FIG. 1A and/or the projector 160 of FIG. 1B). The one or more remote servers 216 may send the projector content 220 and (optionally) the instructions 218 to the projector 222. The one or more remote servers 216 may send instructions 223 and/or content 224 to the one or more voice-enabled devices 208 for presentation. For example, the content 224 may include audio book content, e-book content, game content, video content, online application content, voice narration content (e.g., narration of questions, comments, statements, jokes, and the like presented as audio and/or video by the one or more voice-enabled devices 208), and the like.

Still referring to FIG. 2, the projector 222 may present the projector content 220, which may include one or more images with any combination of text or graphics. For example, the projector 222 may project image 230, which may include information regarding a date, time, and/or weather. The projector 222 may project image 232, which may include calendar information, such as a day and schedule information (e.g., events at different times during the day). The projector 222 may project image 234, which may include alerts such as the ringing of a doorbell, the presence of a person, an open door or window, the temperature of a room or device, the state of a device (e.g., on or off, low-power mode, low-battery status, wireless communication signal strength, etc.), and the like. The projector 222 may project image 236, which may include an image corresponding to an e-book, artwork or music video images corresponding to music played by the one or more voice-enabled devices 208, or other images. The image 230, the image 232, the image 234, and/or the image 236 may be presented while corresponding content is presented by the one or more voice-enabled devices 208. The instructions 218 may include identifiers of the images and/or timing information instructive of when to present the projector content 220. In this manner, the projector 222 may present the images to correspond with the content that is presented by the one or more voice-enabled devices 208, or may present the images as a stand-alone device (e.g., without any corresponding content being presented by the one or more voice-enabled devices 208). The one or more remote servers 216 therefore may respond to certain types of commands and inputs (e.g., as indicated by the data 214, such as voice utterances) by instructing the projector 222 and/or the one or more voice-enabled devices 208 to present content.

Still referring to FIG. 2, the one or more remote servers 216 may include or otherwise be associated with one or more voice modules 250, one or more projector content databases 252, one or more content databases 254, one or more machine learning (ML) modules 256, and one or more presentation modules 260. The one or more voice modules 250 may analyze the data 214 to convert audio data (e.g., when the data 214 includes audio data, such as voice utterances) to an intention (e.g., an intention to play music or audio books, an intention to ask a question, etc.). The one or more voice modules 250 may identify the projector content 220 from the one or more projector content databases 252, and may identify the content 224 from the one or more content databases 254. The projector content 220 may include images (e.g., the image 230, the image 232, the image 234, the image 236), and the content 224 may include content to be presented by the one or more voice-enabled devices 208 in conjunction with the projector content 220 presented by the projector 222. The content 224 stored in the one or more content databases 254 may include e-book content, audio book content, music, video, game content, voice narrated commentary and/or answers to voice-uttered questions, and the like.

In one or more embodiments, the one or more ML modules 256 may be used to determine the projector content 220 and/or the content 224. For example, when the content 224 has few or no corresponding images (e.g., the content 224 is e-book content that does not have corresponding pictures), the one or more ML modules 256 may determine, based on the user 202 and/or the content 224, the projector content 220. The one or more voice modules 250 and/or the one or more ML modules 256 may identify, from the data 214, a mood of the user 202 (e.g., based on the content of the voice utterance represented by the data 214). The one or more ML modules 256 may determine, based on the mood of the user 202, preferences of the user 202, and/or feedback provided by the user 202 (e.g., when the data 214 indicates that the user wants more or less of the projector content 220), the projector content 220. When the content 224 has many images available to present as the projector content 220, the one or more ML modules 256 may identify any of the images to present as the projector content 220, which may include all or a subset of the available images based on the data 214 (e.g., which may indicate information about the user 202, information about the environment, such as the level of light, background noise, time of day, and the like). The one or more ML modules 256 may select the projector content 220 based on the data 214 and the analysis of the data 214 performed by the one or more voice modules 250 to select the most desirable images as the projector content 220. The one or more ML modules 256 may be used to filter out content that may be undesirable to users, such as explicit content or content that the user has indicated is not preferred (e.g., when the data 214 indicates user preferences or feedback). To select images for the presentation content 220, the one or more ML modules 256 may analyze images using tags and/or object recognition techniques to identify images that correspond to the content 224 (e.g., the images selected for the presentation content 220 may include objects described, mentioned, shown, or otherwise presented using the content 224). The one or more ML modules 256 may determine the projector content 220 based on the content 224 by analyzing tags or other data describing the content 224, what people who consume the content 224 also enjoy, and/or based on feedback from the user 202.

In one or more embodiments, the one or more presentation modules 260 may be used to determine the size and/or resolution of the projector content 220. For example, based on the type of projector 222, the type of the projector content 220, and any user settings, the one or more presentation modules 260 may select images of different sizes and resolutions, or may modify images by cropping, redacting, or otherwise editing the projector content 220.

In one or more embodiments, the projector content 220 in the one or more projector content databases 252 may include preselected content and/or content uploaded by the user 202. For example, the inputs 204 may include images uploaded using the data 214, and the projector content 220 may include the uploaded images. The content 224 in the one or more content databases 254 may include uploaded audio, video, or images (e.g., using the data 214 for the upload).

In one or more embodiments, the projector 222 may move or rotate about one or more axis relative to its base 225 to allow the projector to project images on walls or ceilings in different locations, angles, and the like.

Examples, as described herein, may include or may operate on logic or a number of components, modules, or mechanisms. Modules, such as the one or more voice modules 250 and the one or more ML modules 256, may be tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

In one or more embodiments, the instructions 218 and/or the instructions 223 may indicate specific content to present at a given time. For example, the projector content 220 and/or the content 224 may be streamed in real-time for immediate playback, or may be provided with the instructions 218 and/or the instructions 223, respectively, which may direct the one or more voice-enabled devices 208 when to present the content 224 (e.g., or specific portions of the content, such as a page or chapter of an audio book, tracks of a music album, or the like), and which may direct the projector 222 when to present the projector content 220 (e.g., when to present specific images identified by respective image identifiers).

The projector 222 may be configured to communicate via a communications network 270, the one or more voice-enabled devices 208 may be configured to communicate via a communications network 280, and the one or more remote servers 216 may be configured to communicate via a communications network 290, wirelessly or wired (e.g., the same or different wireless communications networks). The communications network 270, the communications network 280, and/or the communications network 290 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 270, the communications network 280, and/or the communications network 290 may have any suitable communication range associated therewith and may include, for example, global networks (e.g., the Internet), metropolitan area networks (MANs), wide area networks (WANs), local area networks (LANs), or personal area networks (PANs). In addition, communications network 270, the communications network 280, and/or the communications network 290 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more voice-enabled devices 208 and/or the one or more remote servers 216 may include any suitable processor-driven device including, but not limited to, a mobile device or a non-mobile, e.g., a static, device. For example, the one or more voice-enabled devices 208 and/or the one or more remote servers 216 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

In one or more embodiments, the one or more voice-enabled devices 208 may include one or more microphones (not shown) for capturing the voice utterance 206. The one or more voice-enabled devices 208 may include a hardware processor (not shown), a graphics processing unit (not shown), a hardware processor core (not shown), or any combination thereof, a main memory (not shown) and a static memory (not shown), some or all of which may communicate with each other via an interlink (not shown). The one or more voice-enabled devices 208 may further include a power management device (not shown), a graphics display device (not shown), an alphanumeric input device (e.g., a keyboard, touch pad, buttons—not shown), and a user interface (UI) navigation device (e.g., a mouse—not shown). In an example, the graphics display device, alphanumeric input device, and UI navigation device may be a touch screen display. The one or more voice-enabled devices 208 may additionally include a storage device (i.e., drive unit—not shown), a signal generation device (not shown), a network interface device/transceiver (not shown) coupled to antenna(s) (not shown), and one or more sensors (not shown), such as a global positioning system (GPS) sensor, a compass, an accelerometer, or other sensor. The one or more voice-enabled devices 208 may include an output controller (not shown), such as a serial (e.g., universal serial bus (USB), parallel, or other wired or wireless (e.g., infrared (IR), near field communication (NFC), etc.) connection to communicate with or control one or more peripheral devices (e.g., a display, stereo receiver, media device, etc.)).

Figure 3:
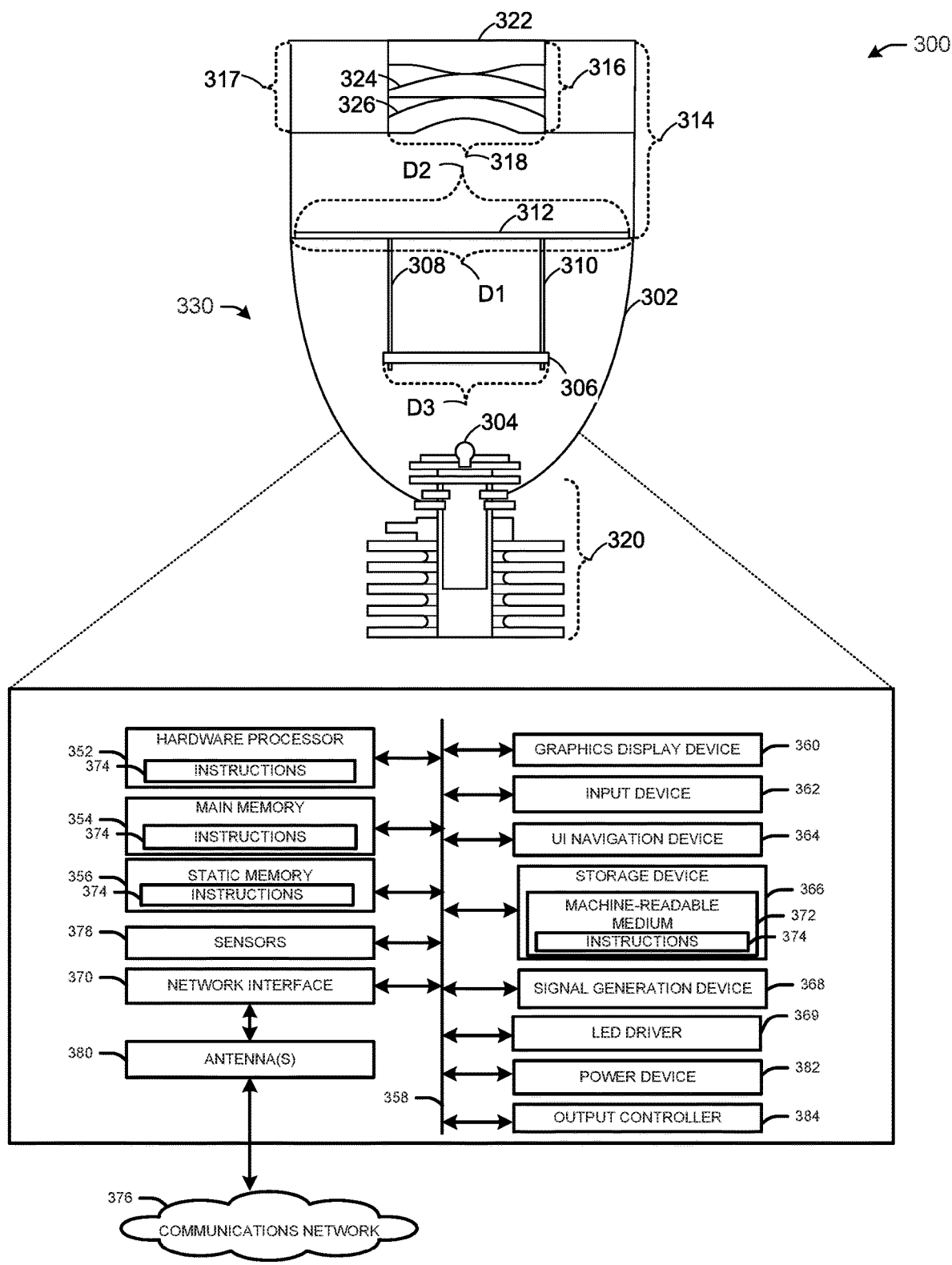
FIG. 3 illustrates a cross-sectional view of an ultra-short throw projector with a transmissive LCD, in accordance with one or more example embodiments of the present disclosure.

FIG. 3 illustrates a cross-sectional view of an ultra-short throw projector 300 with a transmissive LCD, in accordance with one or more example embodiments of the present disclosure.

Referring to FIG. 3, the ultra-short throw projector 300 may include an ellipsoidal reflector 302, a light source 304 (e.g., a white LED or other LED), a Fresnel lens 306 (e.g., a F/2.5 lens) operatively connected to the ellipsoidal reflector 302 by one or more connectors (e.g., connector 308, connector 310, which may be any type of bracket, wire, transmissive material, or component that may allow the Fresnel lens 306 to be positioned within the ellipsoidal reflector 302), a transmissive LCD 312 (e.g., a circular transmissive 480p in-plane switching LCD), a lens assembly 314 (e.g., including a multi-element lens 316 and a camera aperture 318 that controls the amount of light allowed to pass through the lens assembly 314), and an optional heat sink assembly 320 for dissipating heat produced by the light source 304. The connector 308 and the connector 310 may be the same material or may use different materials, or they may be combined into a single connector (not shown) to hold the Fresnel lens 306 in place. The multi-element lens 316 may include multiple lens elements (e.g., lens element 322, lens element 324, lens element 326), which may have the same or different shapes/contours (e.g., convex, concave or aspheric, although the majority of the lens elements may be positive). A lens adapter 317 may be used to hold the multi-element lens 316 in place. The multi-element lens 316 may include any number of lens elements even though three are shown in FIG. 3. An illuminator 330 may include the ellipsoidal reflector 302, the Fresnel lens 306, the heat sink 320, and the light source 304. The illuminator 330 may be circularly symmetrical.

In one or more embodiments, the Fresnel lens 306 may be positioned within the ellipsoidal reflector 302 in a way that allows some light emitted by the light source 304 to be reflected off the ellipsoidal reflector 302 and through the aperture 318 and the multi-element lens 316 without passing through or reflecting off the Fresnel lens 306. The curvature of the ellipsoidal reflector 302 and the use of the Fresnel lens 306 may result in the directing of light emitted by the light source 304 to pass through the transmissive LCD 312 and the multi-element lens 316 to form a circular image of eight feet or more in diameter when the ultra-short thrown projector 300 is positioned at a projection distance of five feet or shorter from a projection surface (e.g., as shown in more detail in FIG. 4).

In one or more embodiments, the Fresnel lens 306 may be a positive Fresnel lens (e.g., a converging lens with a positive focal length). The positive nature of the Fresnel lens 306 may cause light passing through it to converge (e.g., toward the multi-element lens 316). The Fresnel lens 306 may have F-range of F/0.77. For example, the F-number may refer to a ratio of focal length to the diameter of the aperture 318. While the Fresnel lens 306 may be a different type of lens, a useful Fresnel lens may be one that is flat on one side and ridged on the other side. Such design may allow for a short focal length with a relatively smaller volume lens, thereby allowing for an ultra-short throw from a short projection distance at low cost. The Fresnel lens may have an F-number of approximately 0.77 or another F-number.

In one or more embodiments, the circular transmissive LCD 312 may be another type of circular display. However, a 480p resolution or other lower resolution display for the circular transmissive LCD 312 may use larger pixels than a higher resolution display, thereby allowing for an ultra-short throw from a short projection distance in part due to the minimal magnification of emitted light that may be required.

In one or more embodiments, the circular image produced by the circular transmissive LCD 312 may present no apparent off-axis keystone distortion (e.g., in contrast with the keystone distortion that may be evident with an off-axis rectangular image), and may waste minimal flux from the light source 304. The light source 304 may be a single source of light designed to operate at a high power in a low-light environment. The circular transmissive LCD 312 may be positioned outside of the ellipsoidal reflector 302, or at least partially within the ellipsoidal reflector 302, and may have a wider diameter than the diameter of the Fresnel lens 306 (e.g., for all light reflected out of the ellipsoidal reflector 302 to pass through).

In one or more embodiments, pixels of the circular transmissive LCD 312 may minimize the magnification and modulation transfer function required to produce an image, allowing the multi-element lens 316 (e.g., projection lens) to be smaller in size and simpler in design than some other projection lenses. The combination of the ellipsoidal reflector 302, the light source 304, the Fresnel lens 306, and the transmissive LCD 312 may allow light signals projected by the multi-element lens 316 to meet the ultra-short throw projection of images eight feet in diameter from projection distances of five feet or shorter (e.g., shown in more detail in FIG. 4). The multi-element lens 316 may be adjustable in its position relative to the circular transmissive LCD 312.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The ultra-short throw projector 300 may include a hardware processor 352 (e.g., a central processing unit (CPU), a graphics processing unit (GPU) with one or more decoders for decoding coded images/video (e.g., streamed image/video content), a hardware processor core, or any combination thereof), a main memory 354 and a static memory 356, some or all of which may communicate with each other via an interlink (e.g., bus) 358. The ultra-short throw projector 300 may further include a power management device 382, a graphics display device 360, an alphanumeric input device 362 (e.g., a keyboard, touch pad, buttons), and a user interface (UI) navigation device 364 (e.g., a mouse). In an example, the graphics display device 360, alphanumeric input device 362, and UI navigation device 364 may be a touch screen display. The ultra-short throw projector 300 may additionally include a storage device (i.e., drive unit) 366, a signal generation device 368, a LED driver 369 for controlling voltage to the light source 304, a network interface device/transceiver 370 coupled to antenna(s) 380, and one or more sensors 378, such as a heat sensor, a light sensor, a global positioning system (GPS) sensor or other type of location sensor, a compass, an accelerometer, or other sensor. The ultra-short throw projector 300 may include an output controller 384, such as a serial (e.g., universal serial bus (USB), parallel, or other wired or wireless (e.g., infrared (IR), near field communication (NFC), etc.) connection to communicate with or control one or more peripheral devices (e.g., a display, stereo receiver, media device, etc.)).

The storage device 366 may include a machine readable medium 372 on which is stored one or more sets of data structures or instructions 374 (e.g., software) embodying or utilized by any one or more of the techniques or functions described herein. The instructions 374 may also reside, completely or at least partially, within the main memory 354, within the static memory 356, or within the hardware processor 352 during execution thereof by the ultra-short throw projector 300. In an example, one or any combination of the hardware processor 352, the main memory 354, the static memory 356, or the storage device 366 may constitute machine-readable media.

While the machine-readable medium 372 is illustrated as a single medium, the term "machine-readable medium" may include a single medium or multiple media (e.g., a centralized or distributed database, and/or associated caches and servers) configured to store the one or more instructions 374.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the ultra-short throw projector 300 and that cause the ultra-short throw projector 300 to perform any one or more of the techniques of the present disclosure, or that is capable of storing, encoding, decoding, or carrying data structures and content used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 374 may further be transmitted or received over a communications network 376 using a transmission medium via the network interface device/transceiver 370 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 370 may include one or more physical jacks (e.g., Ethernet, coaxial, or phone jacks) or one or more antennas to connect to the communications network 376. In an example, the network interface device/transceiver 370 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the ultra-short throw projector 300 and includes digital or analog communications signals or other intangible media to facilitate communication of such software.

In one or more embodiments, the ultra-short throw projector 300 may receive, via the communications network 376, content (e.g., the projector content 220 of FIG. 2) and instructions (e.g., the instructions 218 of FIG. 2) regarding which content to project and when. In this manner, when a voice-enabled device (e.g., the one or more voice-enabled devices 208 of FIG. 2) detect voice utterances or other types of inputs (e.g., the inputs 204), the result may be the ultra-short throw projector 300 receiving content to be projected as light signals using the light source 304. The light signals emitted by the light source 304 may reflect off one of the ellipsoidal reflector 302 or the Fresnel lens 306, and through the aperture 318 and the multi-element lens 316 to produce light signals that, when projected onto a surface, present images (e.g., the image 114 of FIG. 1A, the image 120 of FIG. 1A, the image 162 of FIG. 1B, the image 166 of FIG. 1B, the image 230 of FIG. 2, the image 232 of FIG. 2, the image 234 of FIG. 2, the image 236 of FIG. 2).

Figure 4:
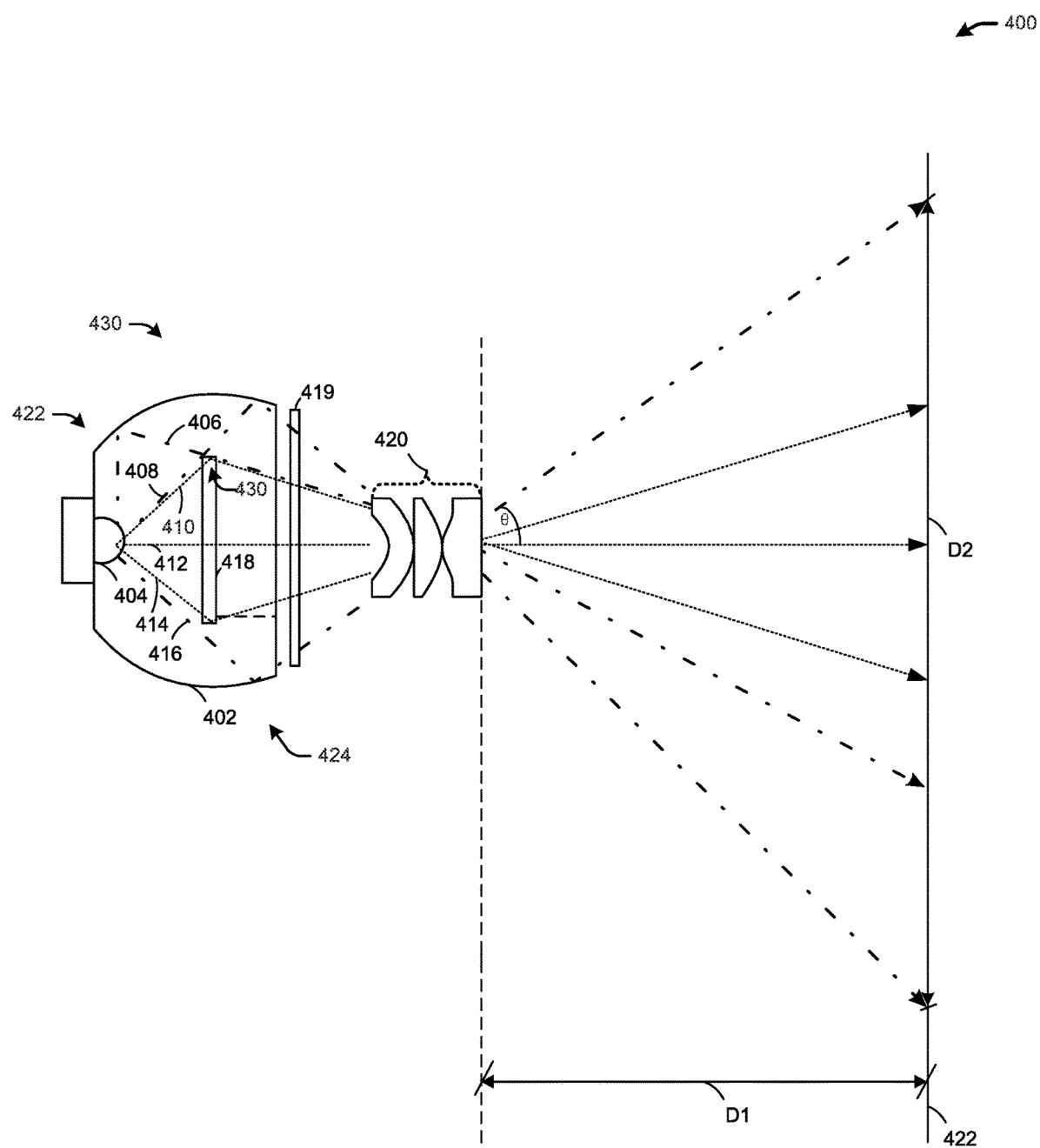
FIG. 4 illustrates an exploded view of an ultra-short throw projector with a transmissive LCD, in accordance with one or more example embodiments of the present disclosure.

FIG. 4 illustrates an exploded view of an ultra-short throw projector 400 with a transmissive LCD, in accordance with one or more example embodiments of the present disclosure.

Referring to FIG. 4, the ultra-short throw projector 400 may include an ellipsoidal reflector 402 (e.g., similar to the ellipsoidal reflector 302 of FIG. 3) and a light source 404 (e.g., similar to the light source 304 of FIG. 3). The light source 404 may be a single high-power surface mounted LED (e.g., white or another type that provides sufficient light in low-light environments) or another type of light source, and may emit light signals (e.g., light signal 406, light signal 408, light signal 410, light signal 412, light signal 414, light signal 416) that may reflect off of one of the ellipsoidal reflector 402 or refract using a Fresnel lens 418 positioned within the ellipsoidal reflector 402. For example, the light signal 406, the light signal 408, and the light signal 416 may be first light signals or first portions of light emitted at angles that result in the first light signals bypassing the Fresnel lens 418 and reflecting at respective angles off of the ellipsoidal reflector 402, through a circular transmissive LCD 419 (e.g., similar to the transmissive LCD 312 of FIG. 3) positioned outside of the ellipsoidal reflector 402, and projected through a multi-element lens 420 (e.g., similar to the multi-element lens 316 of FIG. 3). The light signal 410, the light signal 412, and the light signal 414 may be second light signals or second portions of light emitted at angles that result in the second light signals that are refracted using the Fresnel lens 418 at respective angles, through the circular transmissive LCD 419, and projected through the multi-element lens 420. The ellipsoidal reflector 402 may allow for light that is not refracted by the Fresnel lens 418 to be reflected to the multi-element lens 420 due to the ellipsoidal shape, size, and orientation with respect to the Fresnel lens 418 and the multi-element lens 420. The light source 404 may be positioned inside of the ellipsoidal reflector 402 proximate a first end 422 of the ellipsoidal reflector 402 (e.g., a closed end), and the Fresnel lens 418 may be positioned proximate a second end 424 of the ellipsoidal reflector 402 (e.g., an open end/opening in the ellipsoidal reflector 402 through which the light signal 406, the light signal 408, the light signal 410, the light signal 412, the light signal 414, the light signal 416 may exit the ellipsoidal reflector 402 toward the multi-element lens 420). The first end 422 may correspond to the end of the ellipsoidal reflector 302 of FIG. 3 that is proximal the light source 304, and the second end 424 may correspond to the end of the ellipsoidal reflector 302 that is proximal the multi-element lens 316 of FIG. 3.

Still referring to FIG. 4, the ultra-short throw projector 400 may be positioned at a projection distance D1 from a projection surface 422 (e.g., a display screen, a wall, a ceiling, or another surface or display). The projection distance D1 may be indicative of a distance between the multi-element lens 420 and the display surface 422. The first and second light signals projected by the multi-element lens 420 may result in a circular image (e.g., the image 114 of FIG. 1A, the image 120 of FIG. 1A, the image 162 of FIG. 1B, the image 166 of FIG. 1B, the image 230 of FIG. 2, the image 232 of FIG. 2, the image 234 of FIG. 2, the image 236 of FIG. 2) with diameter D2. An illuminator 430 may include the ellipsoidal reflector 402, the light source 404, and the Fresnel lens 418.

In one or more embodiments, the arrangement of components of the ultra-short throw projector 400 may result in the diameter D2 of eight feet or greater using a short projection distance D1 of five feet or shorter. For example, an image represented by the first and second light signals may be circular because of the circular transmissive LCD 419, and therefore may present no off-axis keystone distortion. Larger pixel size of the circular transmissive LCD 419 (e.g., 480p LCD rather than a higher resolution LCD) may reduce the required magnification and modulation transfer function used to produce an image, allowing the multi-element projection lens 420 to be smaller (e.g., a F/2.5 lens) than some projection lenses in other projector devices. The ellipsoidal reflector 402, the Fresnel lens 418, the light source 404, and a heat sink (e.g., the heat sink 320 of FIG. 3) may form an illuminator device/system, whose catadioptric design may capture the first and second light signals and direct the light signals in an illumination profile for image zones presented by the multi-element lens 420. The illuminator configuration may provide projected image uniformity from center to edge, and may be necessary because the circular transmissive LCD 419 may not scatter light. The size of the Fresnel lens 418 may depend on the size of the circular transmissive LCD 419.

In one or more embodiments, the multi-element lens 420 may have three elements. Any of the elements of the multi-element lens 420 may have a same or different profile as another element of the multi-element lens 420. As shown in FIG. 4, the elements of the multi-element lens 420 may be different from one another and configured to result in the ultra-short throw image projected with diameter D2. The catadioptric design of the ellipsoidal reflector 402 may direct light to be presented by the multi-element lens 420, which may be small in diameter (e.g., F/2.5) and therefore relatively inexpensive because of the catadioptric design of the ellipsoidal reflector 402.

Referring to FIG. 3 and to FIG. 4, the Fresnel lens 306 of FIG. 3 and the Fresnel lens 418 of FIG. 4 may include grooves (not shown) formed by concentric circles or annular rings. Any groove in the Fresnel lens 306 of FIG. 3 and the Fresnel lens 418 of FIG. 4 may refract light may function as an individual refracting surface. To reduce the efficiency of the Fresnel lens 418, the groove height of the Fresnel lens 418 may be locally reduced. The ellipsoidal reflector 402 may be masked or coated to reduce its efficiency, or the shape of the ellipsoidal reflector 402 may be feathered to reduce efficiency. The reduced efficiency (e.g., local edge efficiency) of the ellipsoidal reflector 402 and/or the Fresnel lens 418 may allow the multi-element lens 420 to better blend the image border of the reflected and refracted light of FIG. 4.

Also referring to FIG. 3 and FIG. 4, the efficiency of the light source 304 and of the light source 404 may approach 100 percent (e.g., at least 90 percent). To achieve such an efficiency (e.g. minimizing lost light), the ellipsoidal reflector 302 and the Fresnel lens 306 of FIG. 3 may completely surround the emission of light by the light source 304 and may direct the emitted light to the transmissive LCD 312, and because the ellipsoidal reflector 402 and the Fresnel lens 418 of FIG. 4 may completely surround the emission of light by the light source 404 and may direct the emitted light to the circular transmissive LCD 419. High efficiency light usage may allow for an image to be bright with a low thermal profile and a low cost.

Also referring to FIG. 3 and FIG. 4, the size and shape of the ellipsoidal reflector 302 may be based on the diameter of the transmissive LCD 312 and/or a desired throw ratio of a projected image. For any given projector, the width of the image (W) relative to the throw distance (D) is known as the throw ratio D/W. For example, an exit diameter D1 of the ellipsoidal reflector 302 of FIG. 3 (e.g., the diameter of the ellipsoidal reflector 302 through which light emitted by the light source 304 may exit the ellipsoidal reflector 302) may be slightly larger than a diameter D2 of the transmissive LCD 312 of FIG. 3 (e.g., 10 mm larger) to allow for full illumination. For example, the diameter D2 of FIG. 3 may be 62 mm, so the diameter D1 of FIG. 3 may be 72 mm. The ratio of the diameter D1 of FIG. 3 to a second focus may be 0.8. For a desired throw ratio of a projected image, such as an eight foot diameter image using a throw distance of five feet, the throw ratio may be 5/8. Because the diameter D2 of FIG. 4 may be eight feet and the projection distance D1 (e.g., throw) of FIG. 4 may be five feet, the tangent of the cone angle θ of FIG. 4 formed by the reflection of the light signal 416 and the refraction of the light signal 412 may be 4/5 (e.g., using a 3-4-5 triangle).

Still referring to FIG. 3 and FIG. 4, the selection and placement of the Fresnel lens 306 in FIG. 3 and the Fresnel lens 418 in FIG. 4 may be based on a minimum angle of light reflected by the ellipsoidal reflector 302 or the ellipsoidal reflector 402 (e.g., the angle at which the light signal 406 reflects as shown in FIG. 4). The minimum angle of reflection may be the maximum angle of refraction (e.g., the angle of refraction at the end 430 of the Fresnel lens 306, which may be a circular edge at the circumference of the Fresnel lens 306) using the Fresnel lens 306 or the Fresnel lens 418 (e.g., the angle at which the light signal 410 refracts using the Fresnel lens 418 of FIG. 4). The diameter D3 of the Fresnel lens 306 of FIG. 3 may be the maximum diameter of a circle that does not intercept any light refracted by the ellipsoidal reflector 302. The Fresnel lens 306 may be more proximate to the light source 304 than to the transmissive LCD 312, and the focal length of the Fresnel lens 306 may be a focal length that focuses light emitted by the light source 304 at the ellipsoidal reflector 302 second focus.

Still referring to FIG. 3 and FIG. 4, the selection and placement of the multi-element lens 316 of FIG. 3 and of the multi-element lens 420 of FIG. 4 may be based on one or more factors. For example, the focal point of the ellipsoidal reflector 302 may be the same focal point of the Fresnel lens 306, which may be where the multi-element lens 316 is positioned. The focal point of the ellipsoidal reflector 402 may be the same focal point of the Fresnel lens 418, which may be where the multi-element lens 420 is positioned (e.g., the point at which the light emitted by the light source 404 that is reflected and refracted converges may be where to position the multi-element lens 420 as shown in FIG. 4). Optimal lens surfaces for the multi-element lens 316 and for the multi-element lens 420 may include Leman-optimized even aspheric surfaces, having low distortion and a relative illumination percentage of at least 35 percent (e.g., the relative illumination percentage referring to the amount of illumination "roll-off" from the center of an image to the edges of the image, the roll-off being the amount of projected light reaching the center of an image relative to the edges of the image). Plastic lens elements with different index/Abbe numbers may correct for aberrations. The multi-element lens 316 and the multi-element lens 420 may focus images at different distances by adjusting their position relative to the transmissive LCD 312 and the circular transmissive LCD 419, respectively, using a screw-in thread lens holder (e.g. the lens assembly 314 of FIG. 3 may be a screw-in thread lens holder to position the multi-element lens 316 relative to the transmissive LCD 312).

Figure 5:
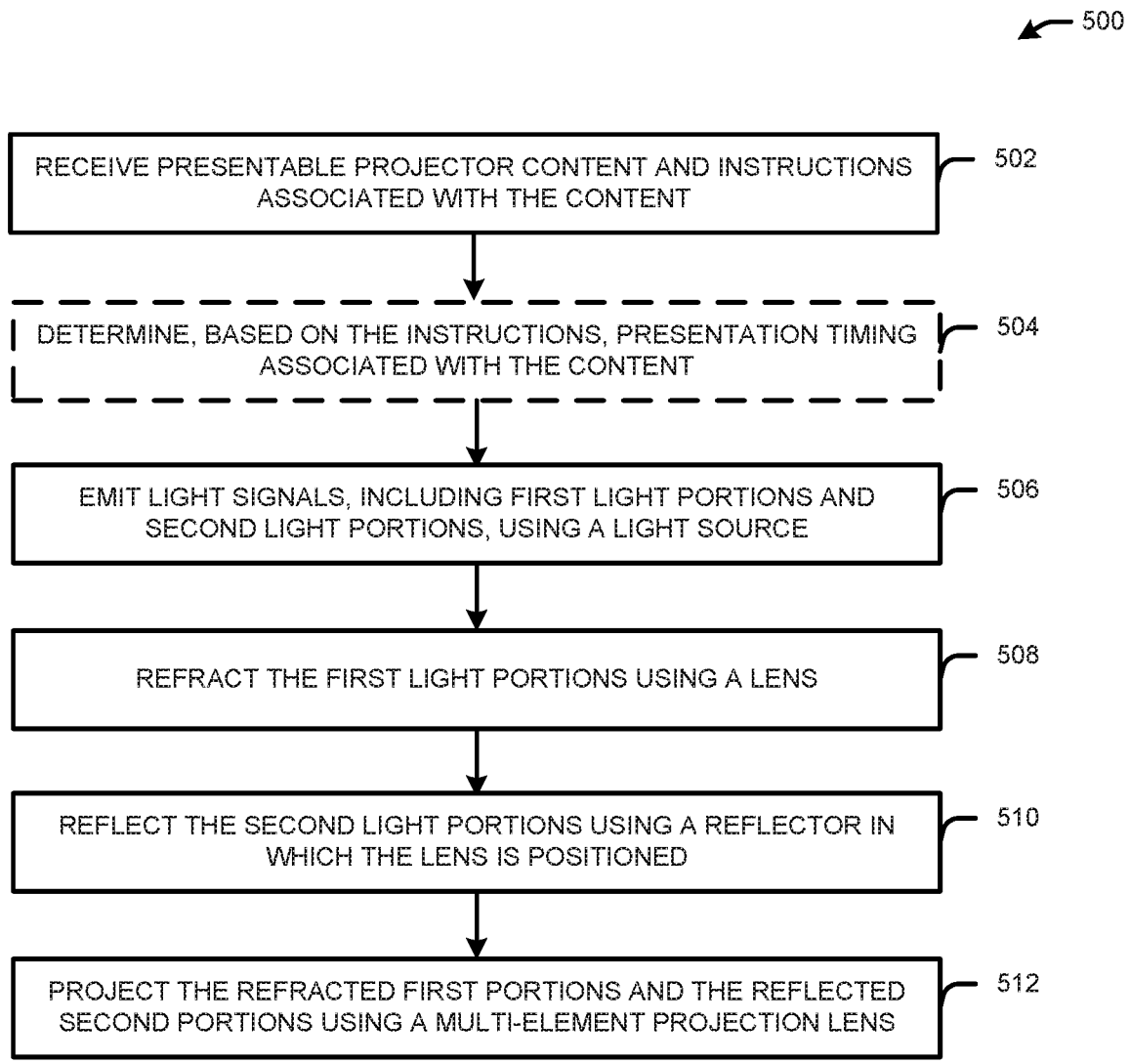
FIG. 5 illustrates a flow diagram for a process for using an ultra-short throw projector with a transmissive LCD, in accordance with one or more example embodiments of the present disclosure.

FIG. 5 illustrates a flow diagram for a process 500 for using an ultra-short throw projector with a transmissive LCD, in accordance with one or more example embodiments of the present disclosure.

At block 502, a device (e.g., the projector 112 of FIG. 1A, the projector 160 of FIG. 1B, the projector 222 of FIG. 2, the ultra-short throw projector 300 of FIG. 3, the ultra-short throw projector 400 of FIG. 4) may receive presentable projector content (e.g., the projector content 220 of FIG. 2) and instructions (e.g., the instructions 218 of FIG. 2) associated with the content. For example, the device may be in communication (e.g., using the one or more communication networks 270 of FIG. 2) with one or more remote servers (e.g., the one or more remote servers 216 of FIG. 2), which may identify the content and instructions for the device, and may send the content and instructions to the device. The content may include images that may be presented by the device without any concurrent presentation of related content using another device (e.g., the one or more voice-enabled devices 208 of FIG. 2), or may be presented by the device while content (e.g., the content 224 of FIG. 2) is presented by the one or more other devices. For example, the images presented by the device may be images that correspond to a book presented by an e-book reader device, images that correspond to an audio book narrated by an audio device, images that correspond to the states of other devices such as Internet-of-things devices, images that display alerts, calendar/schedule information, dates/times, news updates, stock updates, sports updates, and the like. The device may receive the content and instructions using one or more processors (e.g., the hardware processor 352 of FIG. 3) and one or more antennas (e.g., the one or more antennas 380 of FIG. 3).

At block 504, optionally, the device may determine which content to present (e.g., by emitting light using the light source 304 of FIG. 3 or the light source 404 of FIG. 4) at certain times, which may correspond to the content presented at another device, such the text presented on an e-book page, the book text narrated by an audio book, the music played by another device (e.g., album art, music videos, etc.), the current state of another device, and the like. The content may be streamed as received and presented as processed by the device, or the content may be received by the device and presented based on the timing indicated by the instructions.

At block 506, the device (e.g., using the light source 304 of FIG. 3 or the light source 404 of FIG. 4) may emit light signals, including a first portion of light (e.g., light signal 410 of FIG. 4, light signal 412 of FIG. 4, light signal 414 of FIG. 4) and a second portion of light (e.g., light signal 406 of FIG. 4, light signal 408 of FIG. 4, light signal 416 of FIG. 4). The light portions may represent the content that the device received and is to present, and the light portions may produce images by using the steps described further below.

At block 508, the device may refract the first light portion using one or more lenses (e.g., the Fresnel lens 306 of FIG. 3, the Fresnel lens 418 of FIG. 4). The one or more lenses may be positive Fresnel lenses positioned inside of an ellipsoidal reflector (e.g., the ellipsoidal reflector 302 of FIG. 3, the ellipsoidal reflector 402 of FIG. 4). The one or more lenses may not span the entire diameter of the ellipsoidal projector (e.g., allowing the second light signals to bypass the one or more lenses). The one or more lenses may be positioned between the light source and an opening of the ellipsoidal projector, and between the light source and a display (e.g., the transmissive LCD 312 of FIG. 3, the circular transmissive LCD 419 of FIG. 4). In this manner, some light emitted by the light source may be refracted using the one or more lenses inside of the ellipsoidal projector and then may pass through the transmissive display.

At block 510, the device may reflect the second light portions using the ellipsoidal projector. The second light portions may be emitted at respective angles that result in the second light portions not coming in contact with the one or more lenses inside of the ellipsoidal reflector. Instead, the second light portions may reflect off of the inner surface of the ellipsoidal reflector at respective angles that result in the second light portions exiting the ellipsoidal reflector at an opposite side of the ellipsoidal reflector as the side of the ellipsoidal reflector at which the light source may be positioned. Because the one or more lenses may be positioned between the light source and a display, the first and second light portions may pass through (e.g., transmissively) the display. When the display is a LCD with relatively large pixels (e.g., 480p resolution), the required magnification of the light portions to generate an image of eight feet or more in diameter from a projection distance of five feet or shorter may be reduced, allowing the projection lens (e.g., the multi-element lens 316 of FIG. 3, the multi-element lens 420 of FIG. 4) to be smaller (e.g., a F/2.5 lens).

At block 512, the device may project (e.g., using the multi-element lens 316 of FIG. 3, the multi-element lens 420 of FIG. 4) the reflected and refracted light portions from the ellipsoidal illuminator. The projection may result in a display of information regarding a date, time, and/or weather, incoming phone calls or other messages, calendar information, such as a day and schedule information (e.g., events at different times during the day), alerts such as the ringing of a doorbell, the presence of a person, an open door or window, the temperature of a room or device, the state of a device (e.g., on or off, low-power mode, low-battery status, wireless communication signal strength, etc.), and the like. The projection may include images corresponding to an e-book, artwork or music video images corresponding to music played by other devices, or other images.

The embodiments described above are examples and are not meant to be limiting.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by a device and that cause a device to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A projector device comprising:
   an illuminator comprising:
      an ellipsoidal reflector having a first end and a second end, the second end defining an opening of the illuminator;
      a Fresnel lens positioned inside of the ellipsoidal reflector proximate the second end;
      a white light emitting diode (LED) positioned inside of the ellipsoidal reflector proximate the first end, wherein light emitted by the white LED is reflected by the ellipsoidal reflector and refracted by the Fresnel lens; and
      a heat sink that dissipates heat associated with the white LED;
   a transmissive liquid crystal display (LCD) positioned proximate the opening of the illuminator, wherein the transmissive LCD receives the light reflected by the ellipsoidal reflector and the light refracted by the Fresnel lens; and
   a three-lens element projection lens positioned external to the ellipsoidal reflector and adjacent to the transmissive LCD, wherein the three-lens element receives the light reflected by the ellipsoidal reflector and the light refracted by the Fresnel lens via the transmissive LCD.

2. The projector device of claim 1, wherein the three-lens element projection lens generates a circular image based on the light reflected by the ellipsoidal reflector and the light refracted by the Fresnel lens, wherein the circular image has a diameter of at least eight feet at a projection distance of five feet or less, wherein the three-lens element projection lens is a F/2.5 lens, and wherein the Fresnel lens has a smaller diameter than the transmissive LCD.

3. A projector device comprising:
   an ellipsoidal reflector having a first end and an opposing second end;
   a first lens positioned inside of the ellipsoidal reflector proximate the second end;
   a light emitting diode (LED) positioned inside of the ellipsoidal reflector proximate the first end, wherein light emitted by the LED is reflected by the ellipsoidal reflector and refracted by the first lens;
   a transmissive display positioned proximate the second end, wherein the transmissive display receives the light reflected by the ellipsoidal reflector and the light refracted by the first lens; and
   a second lens positioned external to the ellipsoidal reflector, the second lens comprising a three-lens element, wherein the second lens receives the light reflected by the ellipsoidal reflector and the light refracted by the first lens via the transmissive display.

4. The projector device of claim 3, wherein a diameter of the ellipsoidal reflector at the second end is larger than a diameter of the transmissive display.

5. The projector device of claim 3, wherein the first lens is positioned at a first distance from the LED and at a second distance from the transmissive display and wherein the first distance is less than the second distance.

6. The projector device of claim 3, wherein the light reflected by the ellipsoidal reflector bypasses the first lens.

7. The projector device of claim 3, wherein a smallest angle of reflection at the ellipsoidal reflector is equal to a largest angle of refraction at the first lens.

8. The projector device of claim 7, wherein the smallest angle of reflection is proximate to the first end of the ellipsoidal reflector.

9. The projector device of claim 7, wherein the largest angle of refraction is proximate to an outer edge of the first lens.

10. The projector device of claim 5, wherein the second lens has a relative illumination percentage of greater than 35 percent.

11. The projector device of claim 5, wherein the ellipsoidal reflector has a ratio of diameter to focus of 0.80.

12. The projector device of claim 5, wherein the transmissive display is positioned outside of the ellipsoidal reflector and between the ellipsoidal reflector and the second lens.

13. The projector device of claim 5, wherein the second lens is a F/2.5 lens, and wherein the first lens is smaller in diameter than the transmissive display.

14. The projector device of claim 5, wherein the first lens is a Fresnel lens.

15. The projector device of claim 5, further comprising a heat sink at least partially positioned within the ellipsoidal reflector.

16. The projector device of claim 5, wherein the second lens receives at least 95 percent of the light emitted by the LED.

17. A method comprising:
   emitting light using a light emitting diode (LED), wherein the LED is positioned within an ellipsoidal reflector;
   refracting a first portion of the light using a lens positioned within the ellipsoidal reflector to output refracted light;
   reflecting a second portion of the light using the ellipsoidal reflector to output reflected light; and
   projecting the reflected light and the refracted light using a multi-element projection lens positioned outside of the ellipsoidal reflector, wherein the reflected light and the refracted light pass through a circular transmissive liquid crystal display positioned between the ellipsoidal reflector and the multi-element projection lens.

18. The method of claim 17, wherein the reflected light bypasses the lens.

19. The method of claim 17, wherein the first portion of the light is reflected at multiple angles of reflection, and wherein the second portion of the light is refracted at multiple angles of refraction, wherein a smallest angle of reflection of the multiple angles of reflection is equal to a largest angle of refraction of the multiple angles of refraction.

20. The method of claim 17, wherein projecting the reflected light and the refracted light comprises blending the reflected light and the refracted light to generate a circular image using the circular transmissive liquid crystal display.

* * * * *